United States Patent [19]

Pet et al.

[11] Patent Number: 4,795,588

[45] Date of Patent: Jan. 3, 1989

[54] METHOD OF PREPARING A LUMINESCENT EU$^2$+ ACTIVATED STRONTIUM ALUMINATE

[75] Inventors: Robert J. Pet; Martin M. C. I. van den Nieuwenhof; Josephus P. H. M. Duisters, all of Eindhoven, Netherlands

[73] Assignee: U.S. Philips Corporation, New York, N.Y.

[21] Appl. No.: 174,554

[22] Filed: Mar. 29, 1988

[30] Foreign Application Priority Data

Apr. 7, 1987 [NL] Netherlands ........................ 8700808

[51] Int. Cl.$^4$ .............................................. C09K 11/64
[52] U.S. Cl. .............................................. 252/301.4 R
[58] Field of Search ................................. 252/301.4 R

[56] References Cited

U.S. PATENT DOCUMENTS 4,590,405 5/1986 Hoeks et al. ................. 252/301.4 R

FOREIGN PATENT DOCUMENTS 2422883 11/1975 Fed. Rep. of Germany ... 252/301.4 R
60-139785 7/1985 Japan ............................ 252/301.4 R
60-220547 11/1985 Japan ............................ 252/301.4 R

OTHER PUBLICATIONS

Stevels et al "J. Electrochem Soc.", vol. 123, No. 5, 1976, pp. 691–697.

*Primary Examiner*—Jack Cooper
*Attorney, Agent, or Firm*—John C. Fox

[57] ABSTRACT

Method of preparing a luminescent Eu$^{2+}$ activated strontium aluminate defined by the formula $Sr_4Al_{14}O_{25}$:Eu$^{2+}$ in which per mol of the Al present a combination of between 0.1 and 5 mol % of $B_2O_3$ or compounds yielding $B_2O_3$ upon an increase of temperature, and between 0.1 and 10 mol % of at least one of the fluorides and/or chlorides of Ba, Sr, Cs and/or Al and/or RbCl as a flux to a mixture comprising SrO, $Al_2O_3$ and $Eu_2O_3$ or compounds yielding these oxides upon an increase of temperature, whereafter the mixture is subjected to a first heat treatment in a weekly reducing atmosphere at 1100° to 1500° C. Between 0.1 and 10 mol % of at least one of the ammonium halogenides is added per mol of the Al present to the product thus obtained, and the mixture thus obtained is subsequently subjected to a second heat treatment at a temperature of 700° to 1200° C.

2 Claims, 1 Drawing Sheet

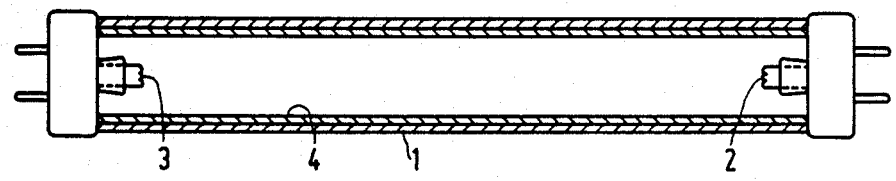

METHOD OF PREPARING A LUMINESCENT $Eu^{2+}$ ACTIVATED STRONTIUM ALUMINATE

BACKGROUND OF THE INVENTION

The invention relates to a method of preparing a luminescent $Eu^{2+}$ activated strontium aluminate defined by the formula $Sr_4Al_{14}O_{25}:Eu^{2+}$, in which a mixture comprising $SrO$, $Al_2O_3$ and $Eu_2O_3$ or compounds yielding these oxides upon an increase of temperature is heated in a weakly reducing atmosphere at a temperature of 1100° to 1500° C., and in which a flux is added to the mixture. The invention also relates to a luminescent strontium aluminate obtained in accordance with said method and to a low-pressure mercury vapour discharge lamp provided with a luminescent screen comprising such a luminescent strontium aluminate.

Luminescent aluminates defined by the formula $Sr_4Al_{14}O_{25}:Eu^{2+}$ with an Eu-content of 0.1 to 10 mol % with respect to the Sr present, are known from Netherlands Patent Application 8201943. These aluminates are crystalline compounds having a characteristic X-ray powder diagram which is shown in the said Netherlands Patent Application. Although these aluminates can be obtained by starting from Sr/Al ratios of ½ to 1/5, it is assumed that the crystal phase substantially has the composition $Sr_4Al_{14}O_{25}$. The said Netherlands Patent Application describes a method of preparation in which the aluminate is formed by a solid state reaction at a high temperature of a mixture comprising $SrO$, $Al_2O_3$ and $Eu_2O_3$. In this method the use of a flux or melting salt is very desirable. The fluxes $H_3BO_3$, $B_2O_3$ and $SrF_2$ are mentioned as examples. After cooling, the product obtained can be washed with water in order to remove the greater part of the flux residues present.

The final product obtained in accordance with the known method still comprises small quantities of flux residues after washing. The presence of these residues may have a detrimental influence on the $Eu^{2+}$ emission. It also appears to be difficult to obtain the desired crystal phase free from disturbing side-phases. A great drawback of the known method is that the aluminate obtained is poorly crystallized and has an unfavourable grain size and grain size distribution so that the luminous flux obtained is not optimum.

The said Netherlands Patent Application states that the aluminate may comprise small quantities of barium (up to at most 10 mol %). The presence of such small quantities of barium does not, however, yield any advantages and is generally found to decrease the efficiency.

An object of the invention is to provide a method of preparing luminescent strontium aluminate defined by the formula $Sr_4Al_{14}O_{25}:Eu^{2+}$ in such a way that the desired crystal lattice of the aluminate is formed very satisfactorily so that the aluminates have a very efficient $Eu^{2+}$ emission.

SUMMARY OF THE INVENTION

According to the invention a method of preparing a luminescent $Eu^{2+}$ activated strontium aluminates defined by the formula $Sr_4Al_{14}O_{25}:Eu^{2+}$ as described in the opening paragraph is characterized in that: per mol of the Al present, a combination of between 0.1 and 5 mol % of $B_2O_3$ or compounds yielding $B_2O_3$ upon an increase of temperature, and between 0.1 and 10 mol % of at least one of the fluorides and/or chlorides of Ba, Sr, Cs and/or Al and/or RbCl is added to the mixture as a flux; whereafter the mixture is subjected to a first heat treatment at 1100° to 1500° C.; per mol of the Al present, between 0.1 and 10 mol % of at least one of the ammonium halogenides is added as a flux to the product thus obtained; and the mixture thus obtained is subsequently subjected to a second heat treatment at a temperature of 700° to 1200° C.

Experiments which have led to the invention have proved that the desired crystal lattice of $Sr_4Al_{14}O_{25}:Eu^{2+}$ is very satisfactorily formed if in a first heat treatment at 1100° to 1500° C. both $B_2O_3$ and also at least one of the fluorides and/or chlorides of Ba, Sr, Cs and/or Al and/or RbCl is used as a flux in the mixture of oxides. If more than the flux quantities stated are used, too many unwanted compounds are formed as side-phases. However, if fewer than the quantities stated are used, an insufficient flux effect will occur so that the desired crystal phase is incompletely formed. At least one of the ammonium halogenides is added to the product obtained after the first heat treatment and subsequently the mixture thus obtained is heated for a second time. In this second heat treatment, possible flux residues are at least partly removed. This second heat treatment does not substantially change the luminescence properties of the aluminate powder obtained. The second heat treatment is, however, necessary if the luminescent aluminate is to be used in low-pressure mercury vapour discharge lamps. In fact, due to the second heat treatment, a great improvement in the luminous flux is then obtained and the luminous flux is maintained during the lifetime of the lamps. If less than the stated quantity of $NH_4$ halogenides is added during the second heat treatment, the effect of the second heat treatment is insufficient. A quantity which is larger than the stated maximum quantity does not result in any improvement and has practical drawbacks. In practice, a small quantity of the metal elements originating from the fluxes used is always left in the luminescent aluminate, regardless of the quantity of fluxes used.

In a preferred embodiment of the method according to the invention, $B_2O_3$ and/or $H_3BO_3$ in combination with $BaF_2$ is used as a flux in the first heat treatment.

With this combination of $B_2O_3$ and $BaF_2$ as a flux during the first heat treatment, the best results as regards crystal formation are obtained. The Ba is at least partly removed as $BaFCl$ due to the addition of $NH_4Cl$ during the second heat treatment.

The $Eu^{2+}$ activated strontium aluminate obtained by the method according to the invention is very suitable for use in a low-pressure mercury vapour discharge lamp. The aluminate is very well excited by the mercury resonance radiation (approximately 254 nm) generated in this lamp.

BRIEF DESCRIPTION OF THE DRAWING

Embodiments of the method according to the invention will now be described in greater detail by way of example with reference to the accompanying drawing.

The drawing is a diagrammatic cross-section of a low-pressure mercury vapour discharge lamp.

DESCRIPTION OF THE PREFERRED EMBODIMENTS

Referring to the drawing, a low-pressure mcercury vapour discharge lamp has a tubular glass wall 1.

Electrodes 2 and 3 between which the discharge is maintained during operation are placed at the ends of the lamp. The lamp contains a small quantity of mercury and a rare gas as a starter gas. The wall 1 constitutes a luminescent screen and serves as a support for the luminescent layer 4 comprising an $Eu^{2+}$ activated strontium aluminate obtained by the method according to the invention. The layer 4 may be conventionally provided on the wall 1, for example, by means of a suspension comprising the luminescent material.

EXAMPLE 1

A mixture was made of
354.10 g of $SrCO_3$
432.14 g of $Al_2O_3$
10.66 g of $Eu_2O_3$
7.48 g of $H_3BO_3$ (0.7 mol % of $B_2O_3$ with respect to Al)
20.62 g of $BaF_2$.

This mixture was heated in a furnace at 1350° C. for 2 hours in a weakly reducing atmosphere. This atmosphere was obtained by passing a nitrogen flow (15 liters/min) comprising 6 vol % of $H_2$ first through water of 24° C. and subsequently into the furnace. The product thus obtained was mixed with 7.0 g of $NH_4Cl$ (1.5 mol % with respect to Al). This mixture was subsequently heated for 1 hour at 1000° C. in such a reducing atmosphere. The product obtained was then washed in heated diluted $HNO_3$ (70° C.) in order to remove the remaining flux residues as much as possible. A quantum efficiency Q of 91.3% upon excitation by 254 nm radiation was measured on the final product thus obtained. The absorption A of the exciting radiation was 92.0%. The location of the emission maximum $\lambda_{max}$ was 492 nm.

EXAMPLES 2 TO 5

In order to determine the influence of the halogen chosen in the ammonium halogenide, four strontium aluminates were prepared analogously to Example 1 in which in addition to $NH_4Cl$ also the ammonium halogenides $NH_4F$, $NH_4Br$ and $NH_4I$ were used during the second heat treatment. Table 1, Examples 2 to 5, shows the ammonium halogenide $NH_4X$ used during the second heat treatment, the quantity of ammonium halogenide in mol % per mol of the Al present, the quantum efficiency Q in % and the absorption A in % at 254 nm radiation and the location of the emission maximum $\lambda_{max}$ in nm.

TABLE 1

| ex. | $NH_4X$ | quantity (mol %) | Q (%) | A (%) | $\lambda_{max}$ (nm) |
| --- | --- | --- | --- | --- | --- |
| 2 | $NH_4CL$ | 3.8 | 84.2 | 91.7 | 492 |
| 3 | $NH_4F$ | 5.4 | 84.2 | 92.4 | 493 |
| 4 | $NH_4Br$ | 2.1 | 84.1 | 91.8 | 493 |
| 5 | $NH_4I$ | 1.4 | 82.9 | 91.8 | 494 |

EXAMPLES 6 TO 13

In a manner corresponding to Example 1 strontium aluminates were obtained in which not only $BaF_2$ but also the salts $BaCl_2$, CsF, CsCl, $SrF_2$, $SrCl_2$, $AlF_3$, $AlCl_3$ and RbCl were used as fluxes during a first heat treatment. The second heat treatment took place in all eight cases after addition of $NH_4Cl$. Table 2, Examples 2 and 6 to 13, shows the fluxes used during the first heat treatment, the quantity of flux in mol % per mol of the Al present Q, A and $\lambda_{max}$.

TABLE 2

| ex. | flux | quantity (mol %) | Q (%) | A (%) | $\lambda_{max}$ (nm) |
| --- | --- | --- | --- | --- | --- |
| 2 | $BaF_2$ | 1.3 | 84.2 | 91.7 | 492 |
| 6 | $BaCl_2$ | 1.1 | 87.0 | 91.9 | 494 |
| 7 | CsF | 1.4 | 83.9 | 91.9 | 493 |
| 8 | CsCl | 1.2 | 84.9 | 87.8 | 495 |
| 9 | $SrF_2$ | 1.6 | 87.7 | 89.3 | 489 |
| 10 | $SrCl_2$ | 1.3 | 85.3 | 89.4 | 494 |
| 11 | $AlF_3$* | 1.5 | 78.9 | 91.1 | 494 |
| 12 | $AlCl_3$ | 1.5 | 85.4 | 90.8 | 488 |
| 13 | RbCl | 1.7 | 79.6 | 87.3 | 495 |

*$AlF_3$ was added as $AlF_3\cdot 3H_2O$.

EXAMPLES 14 TO 18

Analogously to the method of Example 1 strontium aluminates were prepared in which use was made of different quantities of the salts $BaF_2$ and CsF during a first heat treatment. Table 3 shows the salt used, the quantity of these salts in mol % per mol of the Al present, Q and A.

TABLE 3

| ex. | flux | quantity (mol %) | Q (%) | A (%) |
| --- | --- | --- | --- | --- |
| 14 | $BaF_2$ | 1.3 | 92.5 | 88.8 |
| 15 | $BaF_2$ | 2.6 | 90.8 | 91.7 |
| 16 | CsF | 0.6 | 87.3 | 85.9 |
| 17 | CsF | 2.0 | 88.4 | 90.8 |
| 18 | CsF | 5.6 | 82.4 | 94.4 |

Low-pressure mercury vapour discharge lamps of the TLD 36 W type were made of the strontium aluminate obtained by the method according to Example 1. Furthermore low-pressure mercury vapour discharge lamps of the same type were also made for the purpose of comparison, starting from two strontium aluminates a and b obtained by methods not according to the invention. The aluminates a and b were prepared without using a second heat treatment with ammonium halogenide. The aluminate a was obtained by using $BaF_2$ together with $H_3BO_3$ as a flux during a heat treatment analogous to the first heat treatment as described in example 1. The quantum efficiency of this aluminate a was 88.2% and the absorption was 90.9%. The aluminate b was obtained in the same way as aluminate a by using $AlF_3$ instead of $BaF_2$ during the first heat treatment. The quantum efficiency of this aluminate b was only 78.7% and the absorption was 90.7%. Table 4 shows the initial light output and the light output after 100 operating hours of the lamps. The initial light output is given in lm/W and in % with respect to the light output after 100 operating hours. The light output after 100 operating hours (=100%) is given in lm/W. This Table shows that a second heat treatment with the addition of ammonium halogenide in the preparation of the strontium aluminate leads to luminescent aluminates having a better lamp behaviour (initial light output and maintenance of the light output during operation of the lamp) than the luminescent aluminates obtained without such a second heat treatment.

TABLE 4

| | Light output after 0 hr in | | light output after |
| --- | --- | --- | --- |
| ex. | l m/W | % | 100 hrs in l m/W |
| 1 | 84.3 | 101.7 | 82.9 |
| a | 81.5 | 103.2 | 79.1 |
| b | 77.2 | 103.0 | 74.9 |

What is claimed is

1. A method of preparing a luminescent $Eu^{2+}$ activated strontium aluminate defined by the formula $Sr_4Al_{14}O_{25}:Eu^{2+}$, in which a mixture comprising SrO, $Al_2O_3$, $Eu_2O_3$ or compounds yielding these oxides at the heating temperature employed and a flux is heated in a weakly reducing atmosphere at a temperature of 1100° to 1500° C., characterized in that: per mol of the Al present, a combination of between 0.1 and 5 mol % of $B_2O_3$ or compounds yielding $B_2O_3$ at said heating temperature and between 0.1 and 10 mol % of at least one of the fluorides and/or chlorides of Ba, Sr, Cs and/or Al and/or RbCl is present as the flux; whereafter; per mol of the Al present, between 0.1 and 10 mol % of at least one ammonium halide is added as a flux to the so heated mixture; and the mixture thus obtained is subsequently heated at a temperature of 700° to 1200° C. to effect at least partial removal of flux residues present.

2. A method as claimed in claim 1, in which $B_2O_3$ and/or $H_3BO_3$ in combination with $BaF_2$ are used as the flux in the first heating.

* * * * *